United States Patent [19]
Thompson

[11] Patent Number: 4,734,039
[45] Date of Patent: Mar. 29, 1988

[54] PELVIMETRY PHANTOM

[76] Inventor: Eric Thompson, 25556 Meadow Mont., Valenca, Calif. 91355

[21] Appl. No.: 925,981

[22] Filed: Nov. 3, 1986

[51] Int. Cl.⁴ .............................................. G09B 23/00
[52] U.S. Cl. .................... 434/274; 434/267; 434/366
[58] Field of Search ............... 434/274, 366, 267, 273

[56] References Cited
U.S. PATENT DOCUMENTS

| | | | |
|---|---|---|---|
| 88,432 | 3/1869 | Aylworth | 434/273 |
| 175,519 | 3/1876 | Steiger | 434/274 |
| 451,675 | 5/1891 | Klautsch | 434/273 |
| 2,108,229 | 2/1938 | Metz | 434/274 |
| 2,127,774 | 8/1938 | Jacobs | 434/273 |
| 2,988,823 | 6/1961 | Rosenbloom | 434/274 |
| 2,995,833 | 8/1961 | Bezark | 434/274 |
| 3,213,550 | 10/1965 | Kittner | 434/273 |

Primary Examiner—William F. Pate, III
Assistant Examiner—Caroline D. Dennison
Attorney, Agent, or Firm—Iver P. Cooper

[57] ABSTRACT

A pelvimetry phantom is assembled from components permitting replication of all of the pure and mixed pelvic types.

17 Claims, 6 Drawing Figures

PELVIMETRY PHANTOM

BACKGROUND OF THE INVENTION

This invention relates to a pelvimetry teaching phantom to be used to teach students and others how to recognize pelvic types and to perform pelvimetric mensurations, or to demonstrate pelvimetry to patients.

The progress and final outcome of labor are influenced by four factors called the "passage", the "powers", the "passenger" and the "placenta". Abnormalities of any of these components, either singly or in combination, may result in dystocia. The first and last are not subject to change by therapeutic manipulation during delivery.

Pelvimetry is defined as pelvic mensuration; it is the clinical measurement of the bony pelvis, and may be either external or internal, or both, and may be performed manually or by imaging. Pelvimetry is a means of determining whether or not the pelvic architecture and dimensions are sufficient to enable a normal-sized fetus to pass through the bony pelvis. External pelvimetry is the measurement of the external pelvic diameters: external conjugate, interspinous, intercristal, intertrochanteric, transverse of the outlet, and oblique diameters. Internal pelvimetry, performed by an internal pelvic examination, is the measurement of the internal pelvic diameters. The pelvic outlet is characterized by the anteroposterior, anterior sagittal, bispinous, and posterior sagittal diameters; and the pelvic inlet by the diagonal conjugate, obstetric conjugate, and true conjugate diameters.

In evaluating the course and conduct of labor, a thorough knowledge of the pelvic landmarks and their spatial relationships is mandatory, including the pelvic inlet, the midpelvis and the pelvic outlet. Assessment of the pelvic inlet includes evaluation of the true, diagonal and obstetric conjugates and the plane of inlet; of the midpelvis symphysis, ischial spines, sacrum (S3-S4), anteroposterior and interspinous diameters; of the pelvic outlet subpubic arch, ischial tuberosities, tip of the sacrum (not the coccyx), intertuberous distance, anteroposterior and posterior sagittal diameters, degree of pelvic wall convergence, and curve of Carus. Table I below sets forth certain pelvimetric characteristics of the pure pelvic types:

quence of attitudes and positions the fetus must assume in its passage through the birth canal. For this reason, an accurate assessment of the pelvic architecture and diameters is an important part of obstetric care.

Of essential concern is the true (rather than the false) pelvis, which includes the inlet, the midpelvis, and the outlet. Modern concepts of obstetric pelvic types and their influence on the conduct of labor are based for the most part on the classic work of Caldwell and Moldy in the 1930s. The four basic pelvic types identified by them and generally adopted throughout the world are the gynecoid, android, anthropoid and platypelloid pelvic configurations. Significantly, most pelves are "mixed" types, the anterior segment resembling one type and the posterior segment another.

Four pure types of female pelvis exist, described as gynecoid, anthropoid, android and platypelloid (flat). Additionally, 10 mixed pelvic types exist, and are described as follows, with the first term designating the posterior segment, the second term designating the anterior segment: anthropoid-gynecoid, gynecoid-anthropoid, anthropoid-android, gynecoid-android, gynecoid-flat, android-gynecoid, android-anthropoid, android-flat, flat-android, flat-gynecoid. It is physically impossible to combine anthropoid-flat or flat-anthropoid; these combinations do not exist, with the exception that a platypelloid rachitic pelvic may show anthropoid characteristics.

On occasion, one will encounter an asymmetric pelvis that does not fit the above classification.

Pelvic contractures must be considered. The most common cause of inlet contraction is rickets, affecting 5% of black women in the USA. Childhood debilitating diseases may lead to poor pelvic development, thus a generally contracted pelvis. Trauma and fracture to the bony pelvis and known or suspected congenital deformities are also causes of contracture and dystocia.

In relating pelvic type to the outcome of labor, while the probability of serious arrest in the case of pure gynecoid pelvis is 5.6%, this probability increases dramatically to: gynecoid-android=25.0%, gynecoid-anthropoid=24.0%, gynecoid-flat=12.0%, android (pure)=25.0%, android-gynecoid=36.8%, android-anthropoid=38.9%, android-flat=41.2%, anthropoid (pure)=28.7%, anthropoid-gynecoid=9.3%, anthropoid-android=13.0%, flat (pure)=23.7%, flat-

TABLE I

| Pelvimetric Character | PELVIC TYPE | | | |
|---|---|---|---|---|
| | Gynecoid | Android | Anthropoid | Platypelloid |
| Widest transverse diameter of inlet | 12 cm | 12 cm | less than 12 cm | 12 cm |
| Anteroposterior diameter of inlet | 11 cm | 11 cm | greater than 12 cm | 10 cm |
| Side walls | Straight | Convergent | Narrow | Wide |
| Forepelvis | Wide | Narrow | Divergent | Straight |
| Sacrosciatic notch | Medium | Narrow | Backward | Forward |
| Inclination of sacrum | Medium | Forward (lower 1/3) | Wide | Narrow |
| Ischial spines | Not prominent | Prominent | Not Prominent | Not Prominent |
| Suprapubic arch | Wide | Narrow | Medium | Wide |
| Transverse diameter of outlet | 10 cm | less 10 cm | 10 cm | 10 cm |
| Bone structure | Medium | Heavy | Medium | Medium |

(Benson, RC: Current Obstetric and Gynecological Diagnosis and Treatment, Fifth Edition. Los Altos, CA, Lange Medical Publications, 1984)

Variations in pelvic architecture must be carefully evaluated by the attending medical personnel (obstetrician, OB nurse, midwife, accoucheur) since the progress of delivery is directly determined by the segynecoid=22.0%, flat-android=56.0%. These probability statistics emphasize the importance of accurate assessment of the pelvic dimensions and architecture by pelvimetry.

Manual pelvimetry done properly is about as accurate as radiographic pelvimetry in predicting obstetric outcome; moreover, manual pelvimetry has no long-term effects, while X-rays are associated with an increased incidence of leukemia and other childhood malignancies. Radiographic pelvimetry is usually contraindicated, especially during the first trimester, with exceptions such as contemplation of vaginal delivery with breech presentation. It should be noted that in this case, as in most, the indication for radiographic pelvimetry appears near the end of the term; some type of pelvimetry would have already been performed during the initial examination at the inception of the pregnancy. Magnetic resonance imaging (MRI) is currently touted as a viable alternative pelvimetry method, with the advantage that fetal cerebral energy metabolism may be estimated and the detection of fetal hypoxia may be possible. However, MRI imaging availability is sparse and expensive, as it is an emerging imaging modality, and is not readily available, especially in depressed and rural areas, and more especially in less developed and third-world countries.

The capacity of the bony pelvis can be estimated accurately enough for practical purposes by careful clinical examination. Long experience is necessary. Since X-ray films and mechanical methods are no substitute for the careful assessment of the bones of the pelvic girdle, clinical examination may have to be repeated during the course of pregnancy and even during labor if progress is unsatisfactory. It may be best to delay definitive typing and mensuration of the pelvis until shortly before term since patient discomfort may be less when the fetus has achieved maximal size.

In modern obstetrics, X-ray pelvimetry is seldom needed. Occasionally it is used in cases of trauma, fracture and deformity, although even in these cases ultrasonography may yield the necessary information. X-ray pelvimetry usage must be tempered by an appreciation of the genetic radiation hazards involved plus the knowledge that it does not evaluate all of the numerous factors determining the outcome of any given labor. X-ray films thus are not needed in most cases. As with most aspects of obstetrics, the management of possible bony pelvic dystocia demands clinical judgement of the highest order in the best interests of mother and infant.

Coel, U.S. Pat. No. 2,495,568 provides a clinical model of the female pelvis region. While he teaches that it is desirable to use separate castings of the two pelvic halves, he does not teach use of posterior and anterior pelvic segments of different anatomical types. Indeed, his sections are "substantially mirror images of each other." Moreover, it is not even clear that his model specifically includes the bony pelvis. Coel certainly does not discuss the bony pelvis and its morphology, or suggest the use of his model as a pelvimetry teaching aid.

Jacobs, U.S. Pat. No. 2,127,774 describes a manikin for teaching obstetrics which includes major elements of the pelvic bone construction. There is no provision for interchangeably combining posterior and anterior pelvic segments of the various anatomical types.

Kittner, U.S. Pat. No. 3,213,550 discloses an anatomical model which can receive either a male or a female pelvic insert.

SUMMARY OF THE INVENTION

My invention is a pelvimetry phantom assembled from interchangeable gynecoid, android, anthropoid and platypelloid pelvic elements so as to simulate all of the pure and mixed pelvic types.

DETAILED DESCRIPTION OF THE INVENTION

Figure 1:
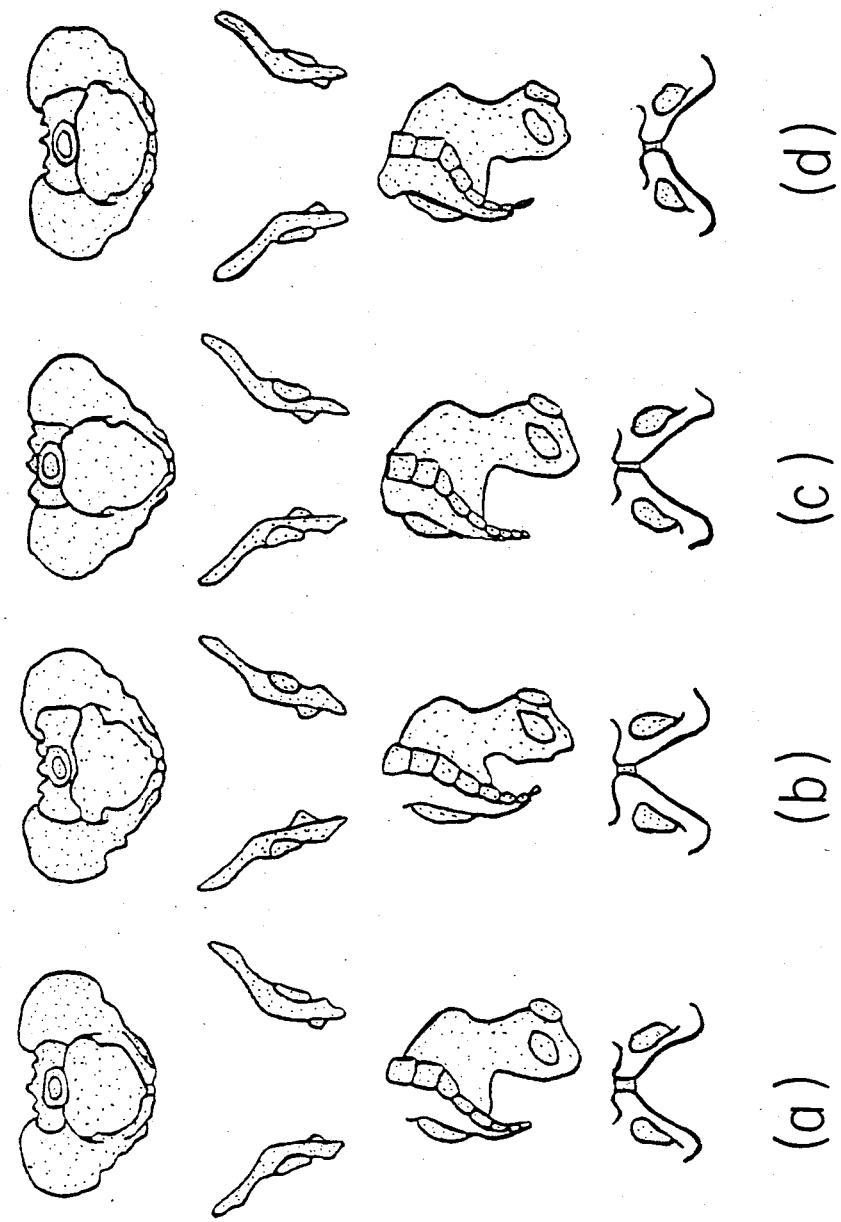
FIG. 1 shows various views of pure pelvic types (a) gynecoid, (b) anthropoid, (c) android, and (d) platypelloid. From top-to-bottom, we have a top view of the strait, an anterior-posterior view of the strait, a lateral view of the strait, and a frontal view of the pubic arch.
Figure 2:
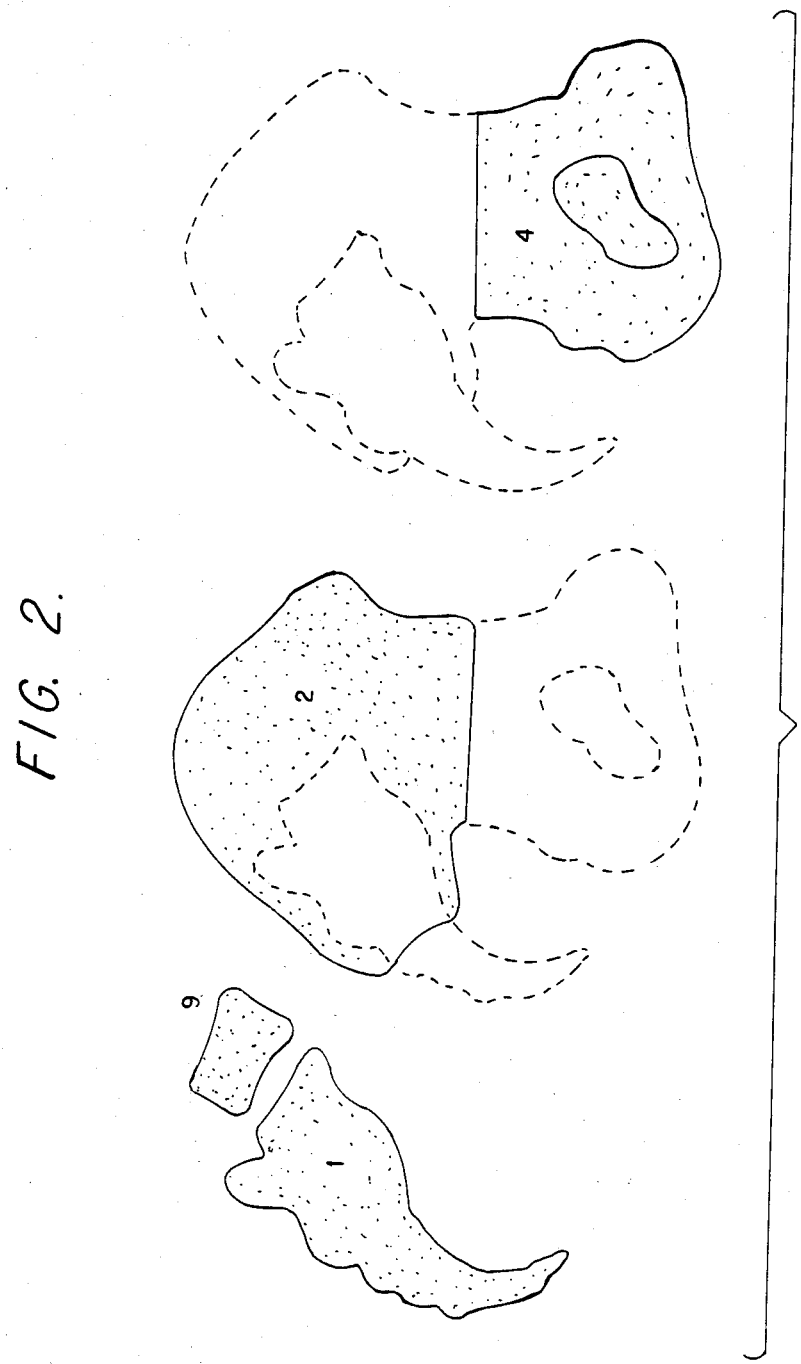
FIG. 2 shows the pelvic elements, or building blocks, of the preferred embodiment. In the figure, we see the sacrum and coccyx 1, the right ilium 2, and the right ischium and pubes 3. (The left ilium and the left ischium and pubes are not depicted here.) The lumbar vertebra 9 also appears.
Figure 3A:
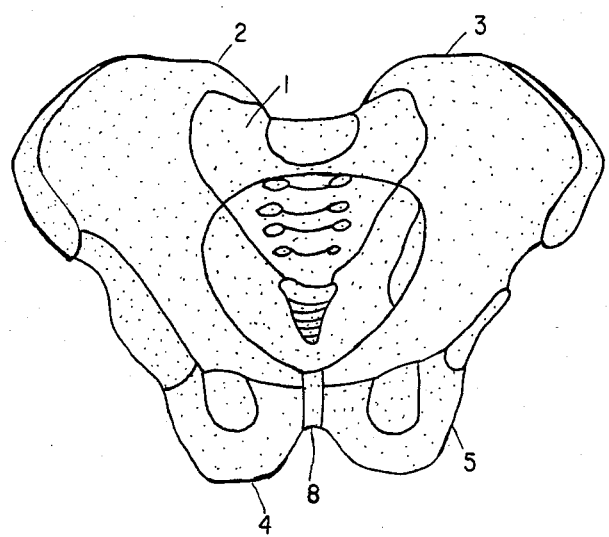
FIG. 3a is an oblique superior view of the bony pelvis phantom, showing the five blocks and the connection means 8.
Figure 3B:
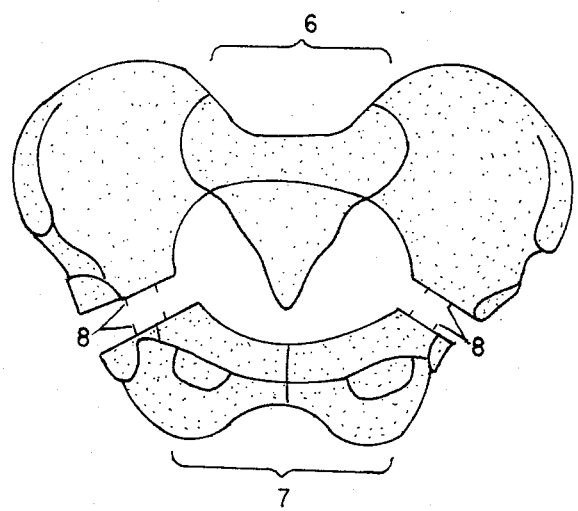
FIG. 3b shows the separation of the phantom at the triradiate zones into the posterior 6 and anterior 7 sections.
Figure 3C:
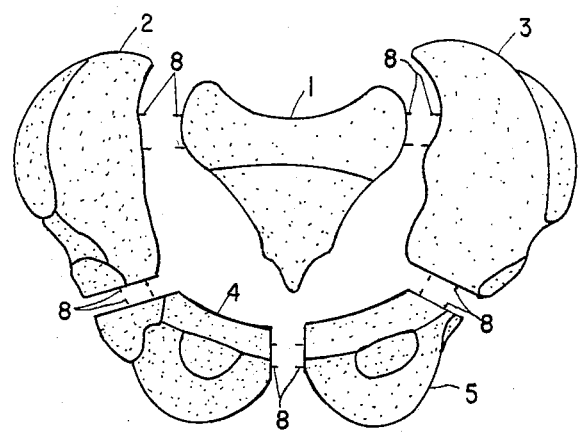
FIG. 3c shows the five blocks of the preferred phantom more clearly, i.e., separated at the public symphysis, the sacroiliac joints and the triradiate zones. The blocks are sacrum and coccyx 1, right ilium 2, left ilium 3, right ischium and pubes 4, left ischium and pubes 5.
Figure 3D:
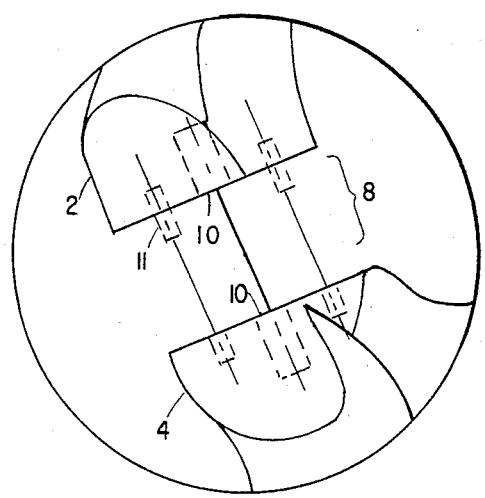
FIG. 3d shows one embodiment of the connection means 8 with magnets 10 and pins 11.

Several embodiments of the pelvimetry phantom will be described in detail below. Each embodiment pertains to a different application or use. Each embodiment, however, includes the bony pelvis assembled of segments to simulate the pelvic pure and mixed types described above, and the basis of each embodiment is the bony pelvis.

The segments, or building blocks, which, when assembled become a pure or mixed type bony pelvis, are:
Block 1: Sacrum and coccyx;
Block 2: Right ilium;
Block 3: Left ilium;
Block 4: Right ischium and pubes;
Block 5: Left ischium and pubes.

The sacroiliac joints are the separating planes of blocks 1 and 3. The separation plane between blocks 2 and 4 and blocks 3 and 5 is approximately the triradiate zone centered on the acetabulum from the notch anterior to the anterior iliac spine through to the greater sciatic notch. The separation plane between blocks 4 and 5 is the pubic symphysis.

Each kit of 20 blocks includes a set of blocks replicating gynecoid, android, anthropoid, and platypelloid forms of block 1, a set of the four forms of block 2, and so on for blocks 3, 4, and 5. When assembled, blocks 1, 2 and 3 become the posterior portion of the pelvis, while blocks 4 and 5 become the anterior portion. Thus, if gynecoid blocks 1-5 are assembled, a pure-type gynecoid pelvis results. However, if gynecoid blocks 1-3 and android blocks 4 and 5 are assembled, a mixed-type gynecoid-android pelvis results. Since the blocks are designed so that any posterior (blocks 1, 2, and 3) subassembly and any anterior (blocks 4, 5) subassembly may be joined, any combination of pure- and mixed-type pelvic configuration is possible. Blocks 1, 2 and 3, comprising the posterior segment, must all belong to the same pure type. Thus, a gynecoid block 1 may not be combined into a posterior subassembly with android blocks 2 and 3. Similarly, blocks 4 and 5, comprising the anterior segment, must belong to the same pure type.

Also preferably included in each set is lumbar vertebra L5. Thus, the entire set of blocks is comprised of 21 pieces. A fetal head phantom may be included to complete the system.

Each individual block is life-size and anatomically accurate, as is the resultant assembly.

The assembly of blocks 1–5 provides a complete bony pelvis phantom. If blocks 1, 2 and 4 only, or 1, 3 and 5 only, are assembled an approximation of a sagittal section results, and may be used to provide a more complete learning experience, with a clear view of the inlet, strait and outlet, and the pelvic geography.

Each block is molded by injection molding or casting of a thermoplastic such as ABS or acrylic, a rigid urethane foam, or a hard elastomer such as urethane. Each block contains connecting means either formed when the part is molded or added after molding, depending on the material of which the part is made. The connecting means may be tongue-and-groove, snap-on or friction clasp, snap-in ball or clasp, fastener and threads, keyed or threaded inserts, pins, magnets, a combination of these methods, or other means of releasably connecting two blocks. Final selection of a connection means will be dependent on production methodology, production mold design and production costs.

The first embodiment of the pelvimetry phantom is a set of 21 blocks. Five blocks when assembled replicate the gynecoid pelvic type, five the android, five the anthropoid, and five the platypelloid. Posterior and anterior segments interchange. One block replicates the lumbar vertebra L5. Also preferably included in the kit is a replica of an average-sized fetal head.

This phantom demonstrates the configuration, architecture and anatomic geography of the various pure- and mixed-type pelves and provides a method of comparison of the passage. Comparison of the inlet includes shape, bone structure, anterior and posterior segments, and diameters including diagonal conjugate, anteroposterior, anterior sagittal, posterior sagittal and transverse. Comparison of the midpelvis or strait includes splay of sidewalls, depth, ischial spine characteristics, interspinous diameter, sacral length, inclination and curvature, sacrosciatic notch, and diameters including anteroposterior, anterior sagittal and posterior sagittal. Comparison of the outlet includes subpubic arch, inferior pubic rami, capacity, and diameters including anteroposterior anterior sagittal, posterior sagittal and intertuberous. The fetal head, which is the ultimate pelvimeter, is used to demonstrate and compare position at engagement, attitude, synclitism or asynclitism, usual labor progress and prognosis for delivery. Prognosis includes spontaneous vaginal delivery, any needed manipulation without or with forceps or other instruments, and cesarean section.

This embodiment is used to demonstrate location and mensuration of various diameters and distances, relationship of the individual practitioner's hand and finger sizes and lengths to the bony pelvis to provide skill in pelvimetry without a pelvimeter, application and function of DeLee, Thoms, Klein and other pelvimeters, low and high forceps application, stations of the fetal head, and pelvic anatomy. It allays obstetric patient apprehension by allowing demonstration of the pelvimetry procedure.

While the kit normally includes only blocks for assembly of the conventional pure and mixed types, one would provide blocks simulating the less common asymmetric pelves.

The second embodiment includes all of the first embodiment and, additionally, replicas of the pelvic ligaments such as the sacrospinous, sacrotuberous, arcuate pubic and anterior sacroiliac ligaments. These phantom ligaments are molded of an elastic elastomer such as low durometer urethane, RTV silicone or latex. Means are provided for insertion of the ligaments into the bony pelvis at the appropriate places. The ligaments may be removed from the pelvis.

The third embodiment includes all of the first embodiment. The 21 blocks comprising segments or gynecoid, android, anthropoid and platypelloid pelves and lumbar vertebra L5 are molded of material having the same radiodensity as actual pelvic and vertebral bones.

The fourth embodiment includes all of the first embodiment (bony pelvis) and may include the second embodiment (ligaments), as part of a complete female pelvis. The fourth embodiment phantom is a female pelvis in the lithotomy position sectioned some five cm above the navel with stub legs 5–10 cm long. It has external genitalia, introitus, vagina, cervix, uterus, anus and colon. These parts and the skin are molded of elastomers, and the soft tissues are molded of flexible urethane foams, all realistically palpable. Any pure- or mixed-type assembly described above may be inserted into and removed from this pelvis. Thus, it may be examined, and external and internal pelvimetry may be performed. The fourth embodiment and its elements may be examined both tactilely and visually.

The fifth embodiment includes all of the first, second, third and fourth embodiments. It is manufactured of materials of radiodensities equivalent to the anatomical cognates. Imaging of the phantom by X-ray, CT, etc., is realistic.

BIBLIOGRAPHY

Books

Benson, Ralph C., M.D., et al. *Current Obstetric and Gynecologic Diagnosis and Treatment.* Los Altos, CA: Lange Medical Publications, 1984.

Whitley, Nancy, R.N. *Clinical Obstetrics.* Philadelphia: J. B. Lipincott Co., 1985.

Carrey, Matthew M., M.D., et al. *Obstetrics Illustrated.* London: Churchill Livingstone, 1980.

Govan, A. D. T., M.D., et al. *Gynaecology Illustrated.* London: Churchill Livingstone, 1985.

Beischer, Norman A., M.D. et al. *Obstetrics and the Newborn.* Sydney: W. B. Saunders Co., 1986.

Moore, Kieth L. *Clinically Oriented Anatomy.* Baltimore: Williams and Wilkins, 1985.

Smith, J. W., M.D., et al. *Regional Anatomy Illustrated.* London: Churchill Livingstone, 1983.

Kapandji, I. A. *The Physiology Of The Joints.* London: Churchill Livingstone, 1974.

Rohen, Johannes W., M.D., and Yokochi, Chihiro, M.D. *Color Atlas Of Anatomy.* New York: Igaku-Shoin, 1983.

Meltzer, Yale L. *Expanded Plastics and Related Products.* Park Ridge, NJ: Noyes Data Corp., 1983.

Periodicals

Fine, E. A., M.D., et al. "Comparison Of The Thoms and Modified Ball Methods in Manual Pelvimetry." *American Journal of Obstetrics and Gynecology.* May 1, 1980.

I claim:

1. An anatomically correct pelvimetry phantom of a selected pure or mixed anatomical type comprising a replica of at least part of the anterior section of the bony pelvis and a replica of at least part of the posterior section of the bony pelvis and connection means for separably connecting said sections to form a complete replica of the bony pelvis of a pure or a mixed anatomical type.

2. The phantom of claim 1, wherein the anterior section is selected from the group consisting of gynecoid, android, anthropoid and platypelloid anterior pelvic sections and the posterior section is selected from the group consisting of gynecoid, android, anthropoid, and platypelloid posterior pelvic sections.

3. A pelvimetry phantom comprising a replica of at least part of the anterior section of the bony pelvis and a replica of at least part of the posterior section of the bony pelvis, said sections being separably connected to form a complete replica of the bony pelvis of a pure or mixed anatomical type, where the anterior section further comprises separably connectable blocks replicating (a) the right ischium and pubes and (b) the left ischium and pubes.

4. The phantom of claim 3, where blocks (a) and (b) are separated at the pubic symphysis.

5. A pelvimetry phantom comprising a replica of at least part of the anterior section of the bony pelvis and a replica of at least part of the posterior section of the bony pelvis, said sections being separably connected to form a complete replica of the bony pelvis of a pure or mixed anatomical type, where the posterior section further comprises separably connectable blocks replicating (a) the sacrum and coccyx, (b) the right ilium, and (c) the left ilium.

6. The phantom of claim 5, where blocks (a) and (b), and blocks (b) and (c) are separated at the sacroiliac joints.

7. A pelvimetry phantom comprising a replica of at least part of the anterior section of the bony pelvis and a replica of at least part of the posterior section of the bony pelvis, said sections being separably connected to form a complete replica of the bony pelvis of a pure or mixed anatomical type, where the posterior section further comprises separably connectable blocks replicating (a) the sacrum and coccyx, (b) the right ilium, and (c) the left ilium, and the anterior section further comprises separably connectable blocks replicating (d) the right ischium and pubes and (e) the left ischium and pubes.

8. The phantom of claim 7, where blocks (b) and (d), and (c) and (e), are separated in the triradiate zone centered on the acetabulum from the notch anterior to the anterior iliac spine through to the greater sciatic notch.

9. The phantom of claim 1, further comprising a replica of lumbar vertebra L5.

10. A pelvimetry teaching and demonstration kit comprising the pelvimetry phantom of claim 1 and a fetal head phantom.

11. The phantom of claim 9, further comprising replicas of the pelvic ligaments and means for removably connecting the ligaments to the pelvic sections.

12. The phantom of claim 11, further comprising replicas of tissues and organs of the female pelvis.

13. The phantom of claim 12, wherein the various anatomical replicas have radiodensities equivalent to that of their anatomical cognates.

14. A kit for the assembly of a pelvimetry phantom, capable of simulating any of the standard pure and mixed pelvic types, which comprises replicas of anterior gynecoid, anthropoid, android and platypelloid pelvic sections and replicas of posterior, gynecoid, anthropoid, android and platypelloid sections, anterior sections being adapted to be releasably connected to any of said posterior sections.

15. The kit of claim 14, further comprising a plurality of block elements from which each type of posterior or anterior pelvic section is assembled.

16. A kit for the assembly of a pelvimetry phantom, capable of simulating any of the standard pure and mixed pelvic types, which comprises sets of blocks replicating (a) the sacrum and coccyx, (b) the right ilium, (c) the left ilium, (d) the right ischium and pubes, and (e) the left ischium and pubes, each set of blocks comprising one block of each of the gynecoid, anthropoid, android and platypelloid types.

17. A kit for the assembly of a pelvimetry phantom, capable of simulating a plurality of pelvic types, comprising replicas of a plurality of anterior sections of different pelvic types and a plurality of posterior sections of different pelvic types.

* * * * *